(12) United States Patent
Raman

(10) Patent No.: US 11,372,843 B2
(45) Date of Patent: Jun. 28, 2022

(54) FUNCTION-BASED INDEXES IN DATABASE SYSTEMS

(71) Applicant: Oracle International Corporation, Redwood Shores, CA (US)

(72) Inventor: Sridevi Raman, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 36 days.

(21) Appl. No.: 17/037,774

(22) Filed: Sep. 30, 2020

(65) Prior Publication Data

US 2022/0100730 A1 Mar. 31, 2022

(51) Int. Cl.
*G06F 16/23* (2019.01)
*G06F 16/22* (2019.01)

(52) U.S. Cl.
CPC ...... *G06F 16/2365* (2019.01); *G06F 16/2282* (2019.01)

(58) Field of Classification Search
CPC .......... G06F 16/2365; G06F 16/2282
See application file for complete search history.

(56) References Cited

U.S. PATENT DOCUMENTS

2015/0310049 A1* 10/2015 Konik ................ G06F 16/2455
707/741

* cited by examiner

*Primary Examiner* — Albert M Phillips, III
(74) *Attorney, Agent, or Firm* — IPHorizons PLLC; Narendra Reddy Thappeta

(57) ABSTRACT

A database system provided according to an aspect of the present disclosure provides indexed data for non-deterministic functions. In an embodiment, a request to maintain an indexed data for a non-deterministic function is received. The non-deterministic function specifies a set of input variables and a set of output variables and a manner in which respective output values are generated for the set of output variables based on corresponding input values for the input variables. Generating output values entails performing operations defined based on a set of data classes in the database system. An indexed data is formed, indicating corresponding output values for respective set of input values present in the set of data classes in the database system. The indexed data is updated when a change to data elements of a first data class of the set of data classes is processed.

20 Claims, 14 Drawing Sheets

Supplier_master — 220

| Supplier_id | Supplier_name |
|---|---|
| 1001 | Supplier1 |
| 1002 | Supplier2 |
| 1003 | Supplier3 |
| 1004 | Supplier4 |
| 1005 | Supplier5 |
| 1006 | Supplier6 |
| 1007 | Supplier7 |
| 1008 | Supplier8 |
| 1009 | Supplier9 |
| 1010 | Supplier10 |
| 1011 | Supplier11 |
| 1012 | Supplier12 |
| 1013 | Supplier13 |

Rows: 221–233

*FIG. 2B*

Item_master — 200

| Item_id | Item_name |
|---|---|
| 101 | Item1 |
| 102 | Item2 |
| 103 | Item3 |
| 104 | Item4 |
| 105 | Item5 |
| 106 | Item6 |

Rows: 201–206

*FIG. 2A*

Item_supplier 240

| Item_id | Supplier_id | IsPrimarySupplier | |
|---|---|---|---|
| 101 | 1001 | N | ← 241 |
| 101 | 1002 | N | ← 242 |
| 101 | 1003 | Y | ← 243 |
| 101 | 1004 | N | ← 244 |
| 102 | 1005 | Y | ← 245 |
| 102 | 1006 | N | ← 246 |
| 102 | 1007 | N | ← 247 |
| 103 | 1010 | N | ← 248 |
| 103 | 1008 | Y | ← 249 |
| 103 | 1010 | N | ← 250 |
| 103 | 1011 | N | ← 251 |
| 103 | 1012 | N | ← 252 |
| 104 | 1004 | Y | ← 253 |
| 105 | 1005 | Y | ← 254 |
| 106 | 1006 | Y | ← 255 |

*FIG. 2C*

```
301 → select sm.supplier_name
302 → from item_supplier isp, supplier_master sm
303 → where isp.supplier_id = sm.supplier_id
304 → and isp.item_id = :input_item_id
305 → and isp.primary_supplier = 'Y';
```

*FIG. 3A*

```
311 → CREATE OR REPLACE FUNCTION get_primary_supplier (
312 →   in_item_id IN NUMBER
313 → ) RETURN VARCHAR2
314 →   DETERMINISTIC
315 → AS
316 →   l_sup_name VARCHAR2(100);
317 → BEGIN
318 →   FOR i IN (
319 →     SELECT
320 →       sm.supplier_name supplier_name
321 →     FROM
322 →       item_supplier isp,
323 →       supplier_master sm
324 →     WHERE
325 →       isp.supplier_id = sm.supplier_id
326 →       AND isp.item_id = in_item_id
327 →       AND isp.primary_supplier = 'Y'
328 →   ) LOOP
329 →     l_sup_name := i.supplier_name;
330 →     EXIT;
331 →   END LOOP;
332 →
333 →   return(l_sup_name);
334 → END;
```

*FIG. 3B*
*(PRIOR ART)*

| | Item_id | Supplier_id | IsPrimarySupplier |
|---|---|---|---|
| 371 → | 101 | 1001 | Y* |
| 372 → | 101 | 1002 | N |
| 373 → | 101 | 1003 | N |
| 374 → | 101 | 1004 | N |
| 375 → | 102 | 1005 | Y |
| 376 → | 102 | 1006 | N |
| 377 → | 102 | 1007 | N |
| 378 → | 103 | 1010 | N |
| 379 → | 103 | 1008 | N |
| 380 → | 103 | 1009 | Y |
| 381 → | 103 | 1010 | N |
| 382 → | 103 | 1011 | N |
| 383 → | 103 | 1012 | N |
| 384 → | 104 | 1004 | Y |
| 385 → | 105 | 1005 | Y |
| 386 → | 106 | 1006 | Y |

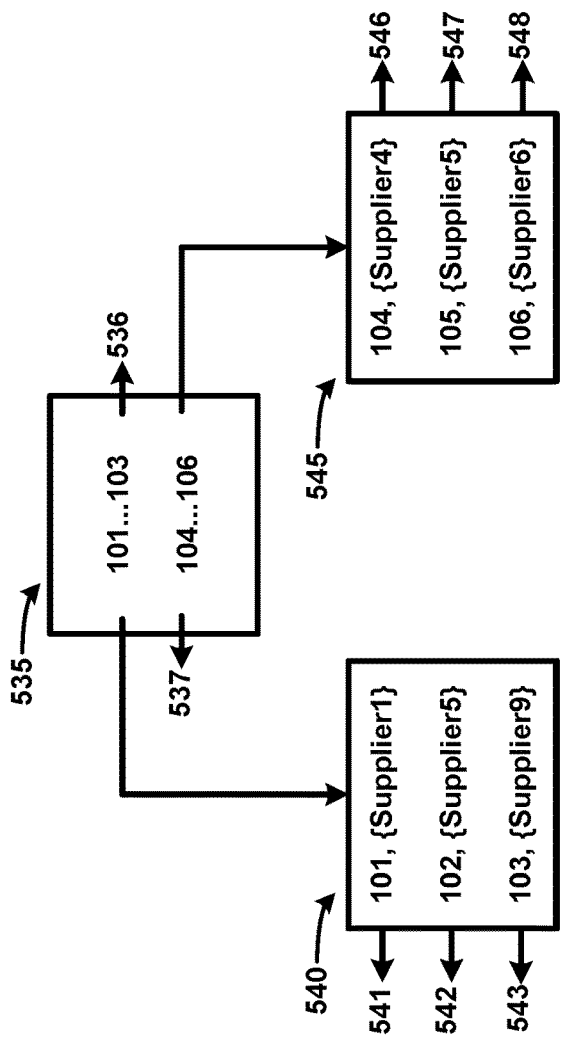

550

| Column Name | Nullable | Datatype |
|---|---|---|
| IND_OBJ# | NOT NULL | NUMBER |
| DEP_TAB_OBJ# | NOT NULL | NUMBER |
| DEP_TAB_COL# | | NUMBER |

551 → IND_OBJ#
552 → DEP_TAB_OBJ#
553 → DEP_TAB_COL#

| INDEX_OWNER | INDEX_NAME | TABLE_OWNER | TABLE_NAME | COLUMN_NAME |
|---|---|---|---|---|
| Owner1 | ITEM_MASTER_IDX01 | Owner1 | ITEM_SUPPLIER | |
| Owner1 | ITEM_MASTER_IDX01 | Owner1 | SUPPLIER_MASTER | SUPPLIER_ID |
| Owner1 | ITEM_MASTER_IDX01 | Owner1 | SUPPLIER_MASTER | SUPPLIER_NAME |
| Owner1 | ITEM_MASTER_IDX01 | Owner1 | ITEM_MASTER | ITEM_ID |

| | Item_id | Supplier_id | IsPrimarySupplier |
|---|---|---|---|
| 601 → | 101 | 1001 | N |
| 602 → | 101 | 1002 | Y* |
| 603 → | 101 | 1003 | N |
| 604 → | 101 | 1004 | N |
| 605 → | 102 | 1005 | Y |
| 606 → | 102 | 1006 | N |
| 607 → | 102 | 1007 | N |
| 608 → | 102 | 1010 | N |
| 609 → | 103 | 1008 | Y |
| 610 → | 103 | 1009 | N |
| 611 → | 103 | 1010 | N |
| 612 → | 103 | 1011 | N |
| 613 → | 103 | 1012 | N |
| 614 → | 104 | 1004 | Y |
| 615 → | 105 | 1005 | Y |
| 616 → | 106 | 1006 | Y |

| | Item_id | Supplier_id | IsPrimarySupplier |
|---|---|---|---|
| 621 → | 101 | 1001 | N |
| 622 → | 101 | 1002 | Y |
| 623 → | 101 | 1003 | N |
| 624 → | 101 | 1004 | N |
| 625 → | 102 | 1005 | Y |
| 626 → | 102 | 1006 | N |
| 627 → | 102 | 1007 | N |
| 628 → | 102 | 1010 | N |
| 629 → | 103 | 1008 | N |
| 630 → | 103 | 1009 | N |
| 631 → | 103 | 1010 | N |
| 632 → | 103 | 1011 | N |
| 633 → | 103 | 1012 | N |
| 634 → | 104 | 1004 | Y |
| 635 → | 105 | 1005 | Y |
| 636 → | 106 | 1006 | Y |
| 637 → | 103 | 1006 | Y* |

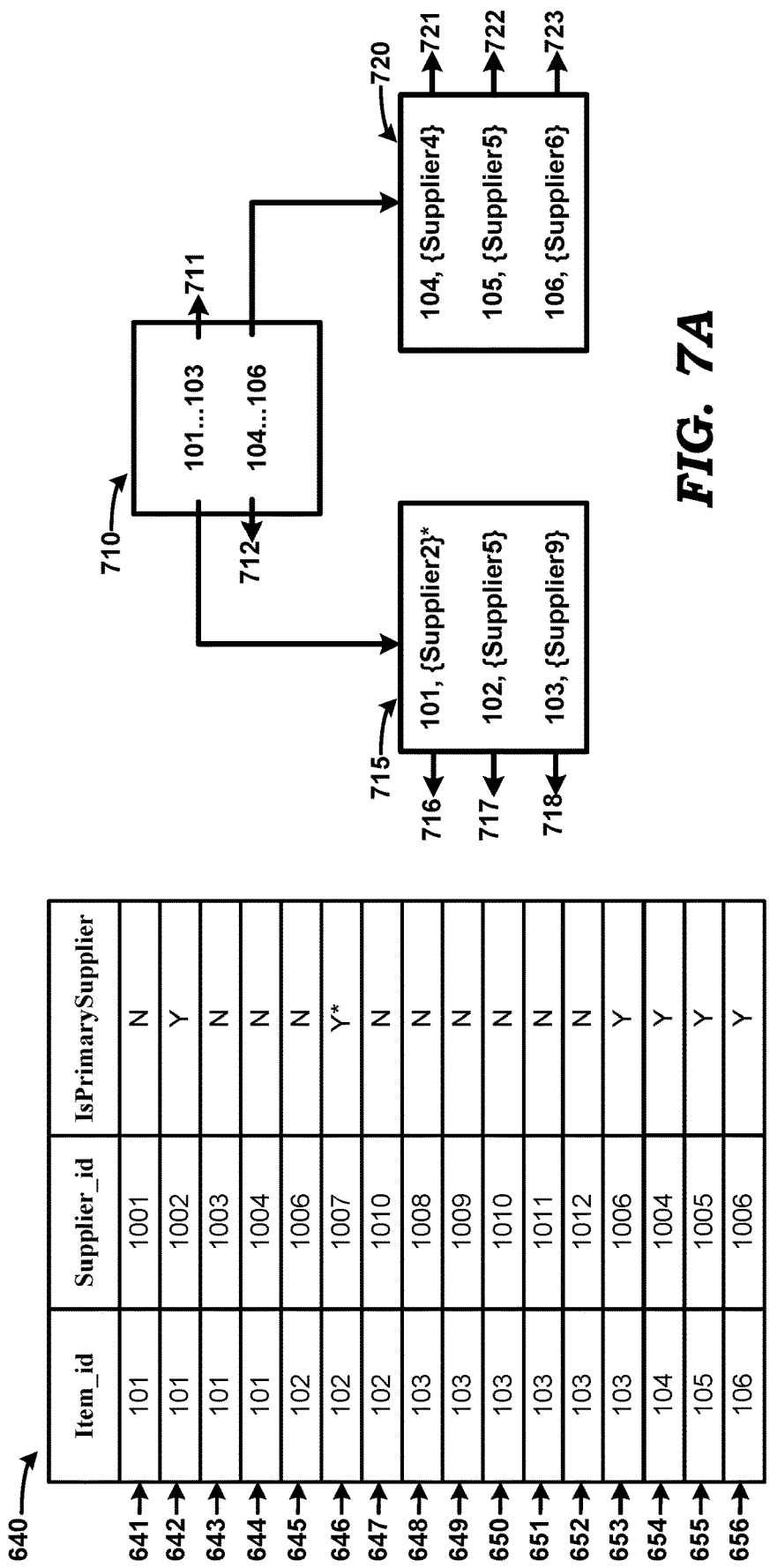

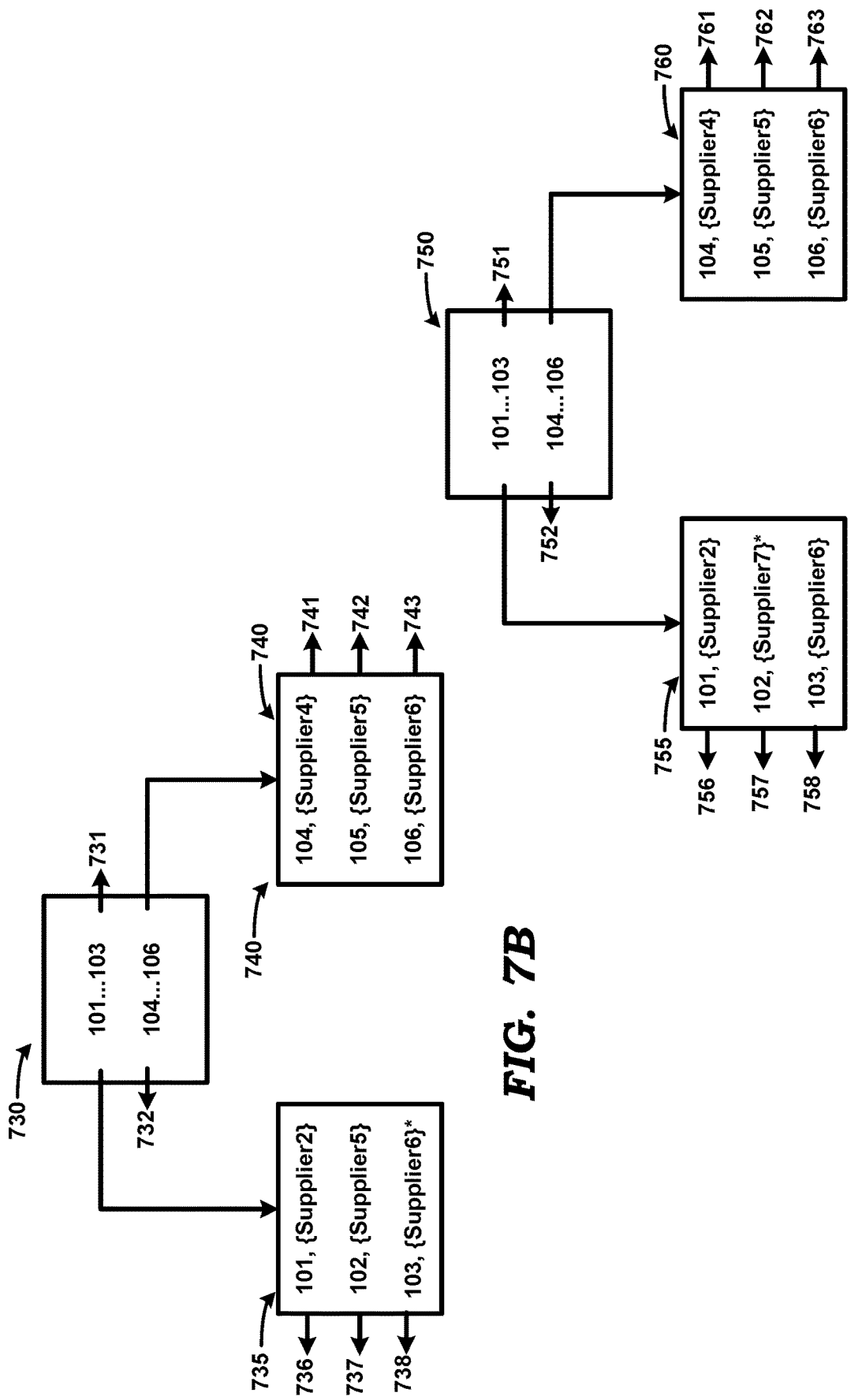

| Supplier_id | Supplier_name |
|---|---|
| 1001 | Supplier1 |
| 1002 | Supplier2 |
| 1003 | Supplier3 |
| 1004 | Supplier4 |
| 1005 | Supplier5 |
| 1006 | Supplier6A |
| 1007 | Supplier7 |
| 1008 | Supplier8 |
| 1009 | Supplier9 |
| 1010 | Supplier10 |
| 1011 | Supplier11 |
| 1012 | Supplier12 |

FIG. 8B

| Supplier_id | Supplier_name |
|---|---|
| 1001 | Supplier1 |
| 1002 | Supplier2 |
| 1003 | Supplier3 |
| 1004 | Supplier4 |
| 1005 | Supplier5 |
| 1006 | Supplier6A* |
| 1007 | Supplier7 |
| 1008 | Supplier8 |
| 1009 | Supplier9 |
| 1010 | Supplier10 |
| 1011 | Supplier11 |
| 1012 | Supplier12 |
| 1013 | Supplier13 |

FUNCTION-BASED INDEXES IN DATABASE SYSTEMS

BACKGROUND OF THE DISCLOSURE

Technical Field

The present disclosure relates to database systems and more specifically to function-based indexes in database systems.

Related Art

A database system refers to a system which permits storage and retrieval of data using structured queries. The data can be organized using relational, hierarchical, network, etc., type models as is well known in the relevant arts. The description henceforth is provided substantially in the context of relational database systems in which data is organized in the form of tables, and queries are according to Structured Query Language (SQL) well known in the relevant arts.

Indexes are often employed in database systems for enhancing performance in responding to queries. As is well known in the relevant arts, a column-based index is commonly associated with a column, with the data elements in the column being organized according to a data structure (e.g., B-tree), which permits faster identification of presence of desired elements when processing a query. Column-based indexes can be maintained on the data of more than one column, in which ordered tuples of the same row of the database are organized in a corresponding data structure.

Thus, a data structure corresponding to the index, instead of the data in the columns, can be examined quickly for processing queries.

Function-based indexes are another type of indexes that are employed in database systems. As is well known in the relevant arts, a function is a set of SQL statements that receives a set of input variables and returns a set of output variables by performing operations based on data stored in one or more tables in the database system. Thus, a function-based index would also be maintained as a corresponding data structure indicating corresponding output values for respective set of input values of the function.

Aspects of the present disclosure are directed to function-based indexes in database systems.

BRIEF DESCRIPTION OF THE DRAWINGS

Example embodiments of the present disclosure will be described with reference to the accompanying drawings briefly described below.

FIG. 2A depicts sample item_master table depicting the various items in a retail business.

FIG. 2B depicts sample supplier_master table depicting the various suppliers in the retail business.

FIG. 2C depicts sample item_supplier table depicting the various suppliers available for specific items in the retail business.

FIG. 3A depicts a sample query to retrieve name of primary supplier of a specific item.

FIG. 3B depicts definition of a function in the context of the retail business.

FIG. 3C depicts a sample change to item_supplier table.

FIG. 5A depicts definition of a non-deterministic function in an embodiment.

FIG. 5B depicts definition of a function-based index in an embodiment.

FIG. 5C depicts indexed data maintained in database system for the function-based index in an embodiment.

FIG. 5D depicts schema of a dictionary table for the function-based index in an embodiment.

FIG. 5E depicts sample SQL view of the dictionary table in an embodiment.

FIGS. 6A-6C depict sample changes to item_supplier table at different time instances in chronological order.

FIGS. 7A-7C depict the changes to indexed data corresponding to the changes of FIGS. 6A-6C respectively.

FIGS. 8A-8B depict sample changes to supplier_master table at different time instances in chronological order, following the state of FIG. 6C.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE EMBODIMENTS OF THE DISCLOSURE

1. Terminology

Non-deterministic function—A function is non-deterministic when the function can generate different output values for a specific set of input values upon invocation of the function at different times.

Data Class—A definition such as columns (in relational databases) and object classes (in case of object oriented databases) which encompass several data instances (data elements at the intersection of row and corresponding column in case of relational databases, and object instances in case of object oriented databases).

Dictionary tables—A set of tables that provide information about the underlying characteristics of the database such as schema definitions, user access privileges, etc.

2. Overview

A database system provided according to an aspect of the present disclosure provides indexed data for non-deterministic functions. In an embodiment, a request to maintain an indexed data for a non-deterministic function is received. The non-deterministic function specifies a set of input variables and a set of output variables and a manner in which respective output values are generated for the set of output variables based on corresponding input values for the input variables. Generating output values entails performing operations defined based on a set of data classes in the database system. An indexed data is formed, indicating corresponding output values for respective set of input values for said set of input variables present in the set of data classes in the database system. The indexed data is updated when a change to data elements of a first data class of the set of data classes is processed.

In an embodiment, the database system is a relational database system containing multiple tables, and each of the set of data classes is a corresponding column of a table of the multiple tables.

In a further embodiment, the set of data classes is specified explicitly in a definition of the non-deterministic function.

According to one more aspect, the change is a truncate operation of a first table of the multiple tables, the first table containing at least one data class of the set of data classes and the updating comprises deleting the indexed data. The change may also correspond to one of insert, update and delete of a first data element in the first data class.

Several aspects of the present disclosure are described below with reference to examples for illustration. However, one skilled in the relevant art will recognize that the disclosure can be practiced without one or more of the specific details or with other methods, components, materials and so forth. In other instances, well-known structures, materials, or operations are not shown in detail to avoid obscuring the features of the disclosure. Furthermore, the features/aspects described can be practiced in various combinations, though only some of the combinations are described herein for conciseness.

3. Example Environment

Figure 1:
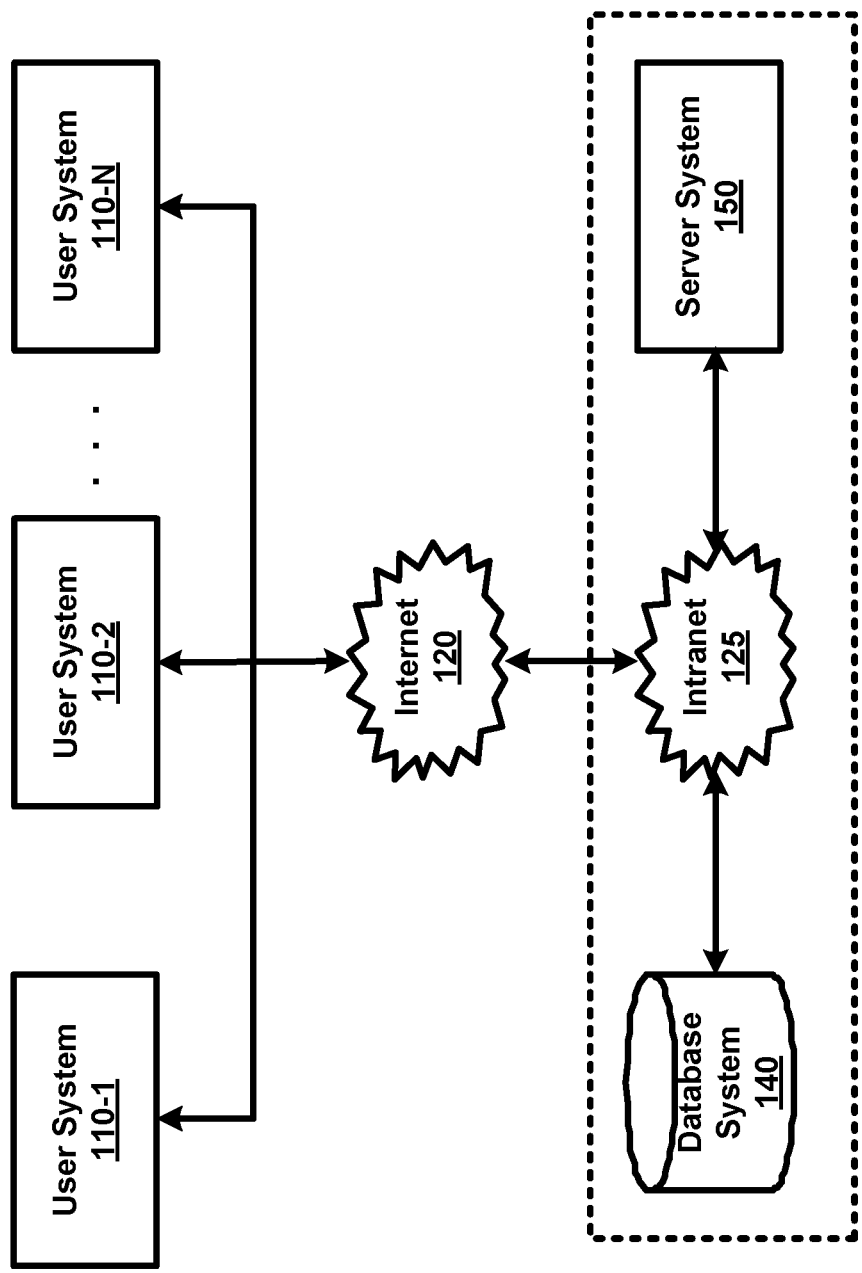
FIG. 1 is a block diagram illustrating an example environment (computing system) in which several aspects of the present disclosure can be implemented.

FIG. 1 is a block diagram illustrating an example environment (computing system) in which several aspects of the present disclosure can be implemented. The block diagram is shown containing user systems 110-1 to 110-N, internet 120, intranet 125, server system 150 and database system 140. User systems 110-1 to 110-N are collectively or individually referred by referral numeral 110, as will be clear from the context.

Merely for illustration, only representative number/type of blocks is shown in FIG. 1. Many environments often contain many more blocks, both in number and type, depending on the purpose for which the environment is designed. Specifically, many instances of server system 150 and database system 140 may be present in the computing system. Each block of FIG. 1 is described below in further detail.

Internet 120 represents a data network providing connectivity between user systems 110-1 to 110-N and server system 150. Internet 120 may encompass the world-wide connected Internet. Internet 120 may be implemented using protocols such as Transmission Control Protocol (TCP) and/or Internet Protocol (IP), well known in the relevant arts.

In general, in TCP/IP environments, a TCP/IP packet is used as a basic unit of transport, with the source address being set to the TCP/IP address assigned to the source system from which the packet originates and the destination address set to the TCP/IP address of the target system to which the packet is to be eventually delivered. An IP packet is said to be directed to a target system when the destination IP address of the packet is set to the IP address of the target system, such that the packet is eventually delivered to the target system by internet 120. When the packet contains content such as port numbers, which specifies an internal component such as target application and/or internal system, the packet may be directed to such application or internal system as well.

Intranet 125 provides connectivity between database system 140 and server system 150, in addition to extending connectivity via Internet 120. Intranet 125 may be implemented using any combination of wire-based or wireless mediums.

Server system 150 represents a server, such as a web/application server, executing one or more software applications such as ERP, CRM, BI applications, etc. Server system 150 may provide suitable interfaces for user systems 110 to access such applications, which in turn may access database system 140 in forming responses to user requests. Many instances of server system 150 and database system 140 may be provided in a cloud infrastructure.

Each of user systems 110-1 to 110-N represents a system such as a personal computer, workstation, mobile device, computing tablet, etc., used by end users. In general each user system 110 sends a request directed to an application executing on server system 150 and receives a corresponding response, often based on the data stored in database system 140.

Database system 140 is based on a non-volatile (persistent) storage, and facilitates storage and retrieval of a collection of records. Data in database system 140 may be organized using any combination of (one or more of) relational, hierarchical, network, etc., type models as is well known in the relevant arts. In an embodiment, database system 140 represents a relational database system available from Oracle Corporation.

In general, database system 140 receives a structured query from server system 150, generates data records by executing the query and sends the data records as a response to the query. Database system 140 employs indexes to enhance the throughput performance in processing of such queries. Aspects of the present disclosure are directed to providing indexing for non-deterministic functions. Accordingly, the description is continued with respect to sample data that demonstrates the need for indexing of non-deterministic functions.

4. Example Need for Indexing of Non-Deterministic Functions

FIGS. 2A-2C depict sample data in database system 140 pertaining to a retail business. Specifically, FIG. 2A depicts sample item_master table in database system 140. Database table 200 stores information about items in the retail business and is shown containing 6 rows [rows 201-206]. Column "Item_id" specifies a unique identifier for an item. Column "Item_name" specifies name of the item.

Only some of the fields, as relevant to an understanding of the disclosure, are depicted in the Figure for conciseness. There will be many more tables containing many more rows and columns as will be apparent to a person skilled in the art.

Although the illustrative embodiment is described with respect to data store storing data pertaining to retail business, function-based indexes may be employed in other contexts also, as will also be apparent to a person skilled in the relevant art.

FIG. 2B depicts sample supplier_master table in database system 140. Specifically, database table 220 stores information about suppliers in the retail business and is shown containing 13 rows [221-233]. Columns "Supplier_id" and "Supplier_name" respectively specify unique identifier for a supplier and the name of the supplier.

FIG. 2C depicts sample item_supplier table in database system 140. Specifically, database table 240 is shown containing 16 rows [241-256]. Columns "Item_id" and "Supplierid" respectively specify item identifier and supplier identifier (corresponding to the respective columns in the master tables). Column "IsPrimarySupplier" specifies whether a specific supplier is the primary supplier for the corresponding item. A value of 'Y' indicates the supplier is the primary supplier and a value of 'N' indicates otherwise. An item may be supplied by several suppliers of which one supplier may be indicated as the primary supplier for the item.

FIG. 3A depicts a sample SQL query employed to retrieve the name of the primary supplier for a specific item. The SQL query shown in FIG. 3A may be encapsulated as a function, get_primary_supplier, as depicted in SQL statements shown in FIG. 3B. Specifically, the function get_primary_supplier in FIG. 3B is shown to receive item identifier using the input variable input_item_id (row 312) and returns the name of the primary supplier using the output variable l_sup_name (row 333). Thus, the function operates on data in tables—item_master, item_supplier and supplier_master.

When function get_primary_supplier is invoked with input value as 101, the output value is Supplier3 (row 243 of FIG. 2C).

It is now shown that the function is a non-deterministic one as described below with respect to FIG. 3C.

Referring to FIG. 3C, table 370 there depicts the status of item_supplier table after the primary supplier of item 101 is changed from supplier with supplier_id 1003 to supplier with supplier_id 1001 (row 371), in a known manner. Thus, when function get_primary_supplier is invoked again with input value as 101, the output value is Supplier1 (row 371 of FIG. 3C).

It may thus be appreciated that the function get_primary_supplier can generate different output values (Supplier3, before the change depicted in FIG. 3C and Supplier1, after the change depicted in FIG. 3C) for a specific set of input values (item id 101) upon invocation of the function at different times. Accordingly, the function is a non-deterministic one.

At least given the various advantages with indexing noted above, it may be desirable to provide indexing based on such functions. The manner in which non-deterministic functions are indexed according to aspects of the present disclosure is described below.

5. Flowchart

Figure 4:
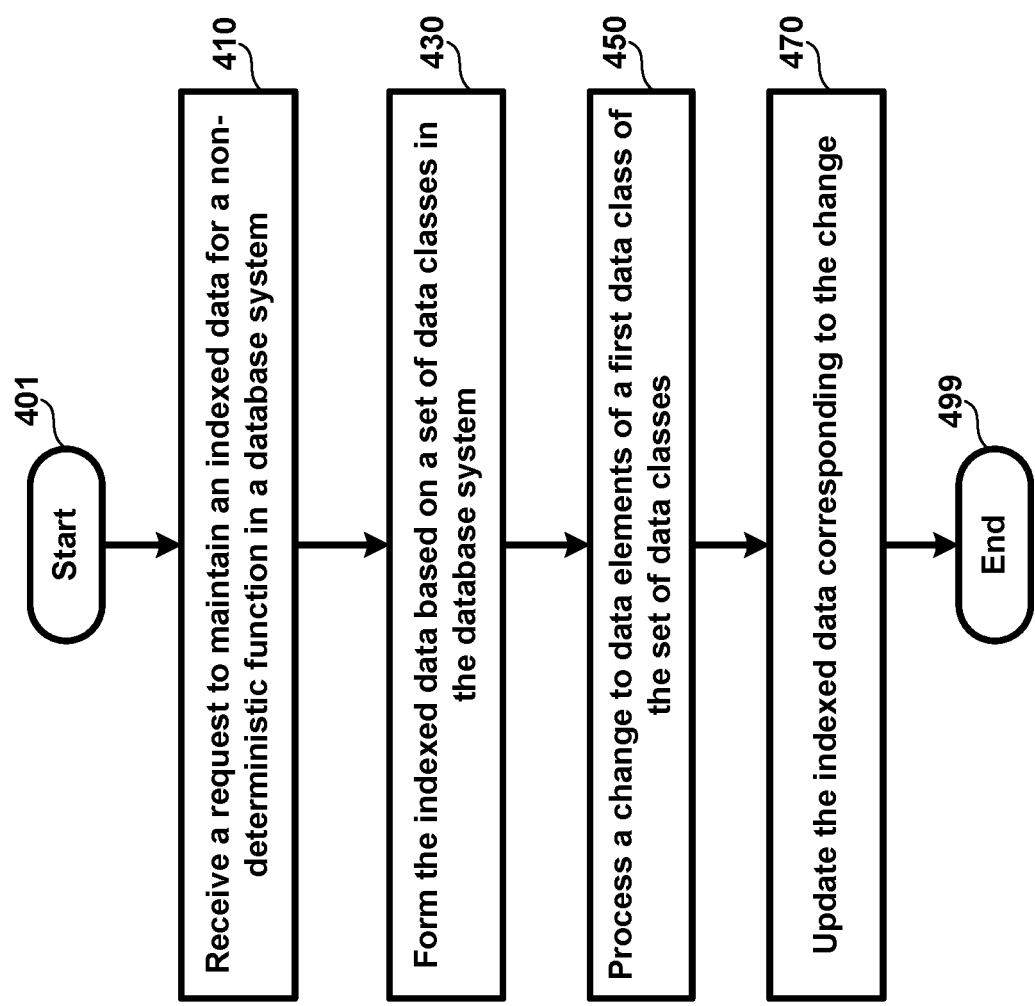
FIG. 4 is a flow chart illustrating the manner in which function-based indexes are maintained in a database according to an aspect of the present disclosure.

FIG. 4 is a flowchart illustrating the manner in which indexes based on non-deterministic functions are maintained in database systems. The flowchart is described with respect to database system 140 of FIG. 1 merely for illustration. However, many of the features can be implemented in other database systems and/or other environments also without departing from the scope and spirit of several aspects of the present disclosure, as will be apparent to one skilled in the relevant arts by reading the disclosure provided herein.

In addition, some of the steps may be performed in a different sequence than that depicted below, as suited to the specific environment, as will be apparent to one skilled in the relevant arts. Many of such implementations are contemplated to be covered by several aspects of the present disclosure. The flow chart begins in step 401, in which control immediately passes to step 410.

In step 410, database system 140 receives a request to maintain an indexed data for a non-deterministic function. The request may specify a set of input variables and a set of output variables. The non-deterministic function may be defined to perform operations based on input values (for the input variables) and a set of data classes (e.g. specific columns in tables) for generating output values (for the output variables). Control passes to step 430.

In step 430, database system 140 forms indexed data indicating corresponding output values for respective set of input values present in the set of data classes in the database system. Database system 140 may invoke the non-deterministic function for all possible values of input variables corresponding to data elements present in the set of data classes to generate the corresponding output variables in order to form the indexed data. Control passes to step 450.

In step 450, database system 140 processes a change to data elements of a first data class of the set of data classes. For example, the first data class may correspond to a column of a table and the change may correspond to a row value (data element) being updated for the column. Control passes to step 470.

In step 470, in response to the change in step 450 and in view of the request in step 410, database system 140 updates the indexed data corresponding to the change. Specifically, database system 140 may identify the corresponding non-deterministic function which is defined based on the first data class. For example, if a particular row of the first data class has been updated, database system 140 may invoke the non-deterministic function with input values corresponding to the updated row and accordingly update the indexed data with the respective output values. The flowchart thereafter ends in step 499.

It should be appreciated that steps 450 and 470 would be repeated several times as changes are made to the data elements in the applicable data classes.

Due to such update of the indexed data, processing of queries based on non-deterministic functions may provide accurate results, in addition to enhancing the throughput performance in processing of queries. The manner in which such features are implemented in an example embodiment is described below in further detail, while continuing to refer to sample data used above.

6. Indexing a Non-Deterministic Function

FIG. 5A depicts definition of a non-deterministic function in an embodiment. Specifically, the function get_primary_supplier in FIG. 5A is shown receiving item identifier using the input variable input_item_id (row 501) and returning the name of the primary supplier using the output variable l_sup_name (row 529).

It may be observed that the function definition includes a keyword "NON-DETERMINISTIC" (row 503) to indicate to database system 140 about the non-deterministic nature of the function. In addition, the set of data classes that the function is based on may be specified explicitly using the clause "DEPENDS ON" (row 504).

Alternatively, such set of data classes may be obtained implicitly by database system 140 by parsing the definition of the non-deterministic function, as will be apparent to a skilled practitioner. Thus, referring to FIG. 5A, database system 140 may parse the SQL statements of lines 513-530 and obtain the set of data classes specified in lines 506-509.

In an embodiment, the "DEPENDS ON" clause may be followed by a comma-separated set of data classes that the non-deterministic function is based on, as depicted in lines 506-509. Database system 140 may comprise multiple tables and each of the data class in the set of data classes is a corresponding column of a table in database system 140.

Thus, if the function is based on all columns of a table, then the table name may be mentioned in the set in "DEPENDS ON" clause. If the function is based on some of the columns of a table, then each column name may be specified within parentheses preceded by the corresponding table name in "DEPENDS ON" clause.

Specifically, referring to FIG. 5A, function get_primary_supplier is indicated to be based on the following set of data classes:

item_supplier table,
column supplier_name of supplier_master table,
column supplier_id of supplier_master table, and
column item_id of item_master table.

The above definition of non-deterministic function is merely for the purpose of illustration in an embodiment. However, alternative ways of defining non-deterministic functions will be apparent to a skilled practitioner without departing from the scope and spirit of several aspects of the present invention, by reading the present disclosure.

FIG. 5B depicts the manner in which an index based on non-deterministic function is specified in an embodiment. Specifically, database system 140 receives a request to maintain indexed data for the non-deterministic function in the form of a set of SQL statements (lines 531-532). Upon executing the statements shown in FIG. 5B, database system 140 may form indexed data corresponding to index named item_master_idx01. Database system 140 may invoke the non-deterministic function for all possible values of input variables corresponding to data elements present in the set of data classes to generate the corresponding output variables in order to form the indexed data. Thus, database system 140 may invoke function get_primary_supplier with input values 101-106 (corresponding to all item ids in item_master table) and store the respective output values (primary supplier names) in the indexed data, as depicted in FIG. 5C.

FIG. 5C depicts a sample B-tree index representing the indexed data pertaining to non-deterministic function get_primary_supplier defined in FIG. 5A. Specifically, indexed data in FIG. 5C is shown containing root node 535 and leaf nodes 540 and 545. Root node 540 is shown containing ranges 536 (for items with item_id values 101 to 103) and 537 (for items with item_id values 104 to 106). Leaf node 540 is shown containing records 541-543 and leaf node 545 is shown containing records 546-548. Although the records are shown containing only the item_id key and the corresponding primary supplier name for ease of understanding, the records in the leaf nodes of a B-tree index may additionally store the corresponding rowids (which point to the physical location of the corresponding rows in the database table), as is well known in the relevant arts.

The indexed data corresponds to data in tables 2A, 2B and 3C. Thus, record 541 of FIG. 5C depicts primary supplier of item 101 as Supplier1 (row 371 of FIG. 3C).

The description is continued with respect to the manner in which a dictionary table is employed to maintain such indexed data pertaining to non-deterministic functions, in accordance with features of the present disclosure.

7. Dictionary Table

In an embodiment, database system 140 may maintain a dictionary table in order to process changes to data elements of data classes on which non-deterministic functions are based. Thus, database system 140 may update the dictionary table when a function-based index is defined (or modified) for a non-deterministic function.

Database system 140 may create the dictionary table as part of creating the database. Thereafter, database system 140 may insert identities of the set of data classes that each non-deterministic function in the database is based on.

FIG. 5D depicts schema of the dictionary table in an embodiment. Specifically, rows 551-553 depict the columns in the dictionary table. Column "Column name" specifies the name of the column in the dictionary table. Column "Nullable" specifies whether the corresponding column may accept null values. A value of 'NOT NULL' indicates that the column value may not accept null values. A value of 'NULL' (or blank) may indicate that the corresponding column may accept null values. Column 'Data Type' specifies the data type for the corresponding column.

Thus, referring to FIG. 5D, the dictionary table of the illustrative embodiment is shown containing the columns IND_OBJ #, DEP_TAB_OBJ # and DEP_TAB_COL #.

IND_OBJ # contains the identity (e.g. database object id) of the function-based index based on a non-deterministic function. IND_OBJ # is shown to be of data type NUMBER and is shown as not accepting NULL values (row 551).

DEP_TAB_OBJ # contains the identity (e.g. database object id) of the table on which the non-deterministic function is based, as specified in DEPENDS ON clause in the function definition (rows 506-509 of FIG. 5A). DEP_TAB_OBJ # is shown to be of data type NUMBER and is shown as not accepting NULL values (row 552).

DEP_TAB_COL # contains the identity (e.g. column id) of the column of the table on which the non-deterministic function is based. DEP_TAB_OBJ # is shown to be of data type NUMBER and is shown as accepting NULL values (row 553).

The data in the dictionary tables (not shown) may be available to users in read-only format of SQL views, as is well known in the relevant arts.

A SQL view (as depicted in FIG. 5E) for the dictionary table may be created in a known manner. Specifically, SQL view 560 is shown containing rows 561-564. Column 'Index_owner' specifies the name of the database user who is the owner of the index. Column 'Index_name' specifies the name of the index. Column 'Table_owner' specifies the name of the database user who is the owner of the corresponding table. Column 'Table_name' specifies the name of the table on which the non-deterministic function is based. Column 'Column_name' specifies the name of the column of the table on which the non-deterministic function is based. It may be appreciated that the columns table_name and column_name in SQL view 560 respectively correspond to the names of the table and column indicated by identities in columns DEP_TAB_OBJ # and DEP_TAB_COL # of dictionary table described above in FIG. 5D.

Thus, index item_master_idx01 is shown to be based on the following set of data classes:

item_supplier table (row 561),
column supplier_id of supplier_master table (row 562),
column supplier_name of supplier_master table (row 563), and
column item_id of item_master table (row 564).

It may be observed that column_name in row 561 has been left blank to indicate that index item_master_idx01 is based on all the columns of item_supplier table. In an alternative embodiment, database system 140 may obtain the list of columns of item_supplier table from the corresponding schema definition of item_supplier table and insert a row corresponding to each column. In such an embodiment, schema changes to columns of item_supplier table may be propagated to the dictionary table by database system 140.

As may be observed with respect to FIGS. 5A and 5E, rows 561-564 of FIG. 5E correspond respectively to set of data classes specified in rows 506-509 of FIG. 5A.

When a change occurs to data elements of any of the data classes in the above set, database system 140 processes the corresponding change as described below with examples.

8. Update to Indexed Data Upon Changes to Data Elements

FIGS. 6A-6C depict sample changes to item_supplier table in an embodiment at respective time instances in a chronological order. Rows marked with * in column IsPrimarySupplier indicate changes. FIGS. 7A-7C depict the corresponding changes to indexed data. Records marked with * indicate changes to indexed data.

FIG. 6A depicts a change to data element of data class IsPrimarySupplier of item_supplier table at a time instance following the state depicted in FIG. 3C. Specifically, table 600 depicts an update to the primary supplier of item with item_id 101. It is assumed that the primary supplier for item 101 is updated from supplier 1001 (refer row 371 of FIG. 3C) to supplier 1002 (refer row 602 of table 600).

Database system 140 processes the change by first retrieving identity of column IsPrimarySupplier and checking for the presence of the identity in dictionary table referred in FIG. 5D. Database system 140 may not find any matching rows since the dictionary table contains the identity of item_supplier table and not column IsPrimarySupplier (as item_master_idx01 is based on all columns of table item_supplier). Database system 140 may then retrieve the identity of the table which contains column IsPrimarySupplier. Database system 140 checks for the presence of identity of item_supplier in the dictionary table. Database system 140 retrieves data corresponding to row 561 (of FIG. 5E) from the dictionary table, where the identity of item_supplier matches. Thus, database system 140 identifies the corresponding index to be item_master_idx01 and the associated non-deterministic function to be get_primary_supplier. Database system 140 may determine the non-deterministic function based on the definition of the function-based index, as is well-known in the relevant arts.

In response to the change, database system 140 invokes function get_primary_supplier only for the input item_id value of 101 (corresponding to the change, and not for all values of item_id in item_master table). Thus, database system 140 updates indexed data containing previous value (record 541 of FIG. 5C) to the current value as shown in record 716 of FIG. 7A.

When a query includes the 'get_primary_supplier' function, the indexed data (of FIG. 7A) may be examined to improve performance of the query, as is well known in the relevant arts.

For example, when the following query is executed before the change of FIG. 6A,
select item_id, item_name, get_primary_supplier (item_id) from item_master where item_id=101;
the result may be as shown below:
101, Item1, Supplier1
Now, when the above query is re-executed for the same item (101) after the change of FIG. 6A, the result returned is:
101, Item1, Supplier2.
Thus, database system 140 updates indexed data to reflect changes to data elements and returns accurate results.

FIG. 6B depicts an insert to the primary supplier of item with item_id 103 at a time instance following the state depicted in FIG. 6A. It is assumed that a new primary supplier (1006) for item 103 is added in item_supplier table (row 637). It may be observed that the previous primary supplier (1009) for item 103 is updated to indicate the status accordingly (as depicted in row 630 of FIG. 6B). Database system 140 processes the change by updating the indexed data as described above with respect to FIG. 6A. The updated indexed data is depicted in FIG. 7B. Specifically, comparing record 718 of FIG. 7A and record 738 of FIG. 7B, it may be observed that indexed data now reflects the new primary supplier of item 103.

FIG. 6C depicts deletion of a row of item_supplier table. Specifically, supplier 1005 is disassociated from item 102. Referring to row 625 of FIG. 6B, supplier 1005 was the primary supplier for item 102. Now, supplier 1007 is marked as the primary supplier for item 102 (row 646 of table 640 in FIG. 6C). Database system 140 processes the change by updating the indexed data as described above. The updated indexed data is depicted in FIG. 7C. Specifically, comparing record 737 of FIG. 7B and record 757 of FIG. 7C, it may be observed that indexed data now reflects the new primary supplier of item 102.

As noted above with respect to change in FIG. 6A, database system 140 invokes function get_primary_supplier only for the changed rows for changes depicted in FIGS. 6B and 6C.

FIGS. 8A-8C depict the manner in which indexed data is updated by database system 140 when changes occur to supplier_master table.

FIG. 8A depicts a change to data element of data class supplier_name at a time instance following the state depicted in FIG. 6C. Specifically, row 806 of table 800 depicts an update to the name of a supplier in supplier_master table. It is assumed that the name of supplier 1006 has been changed from Supplier6 to Supplier6A. Database system 140 processes the change by retrieving data corresponding to row 563 (depicted in SQL view 560 FIG. 5E) from dictionary table as described above.

It may be appreciated that when changes occur to other columns of supplier_master table (not shown), database system 140 may not process the changes.

In response to the change, as noted above, database system 140 invokes function get_primary_supplier only for the input item_id values of 102, 103 and 106 as supplier 1006 is a supplier for items 102, 103 and 106 (as depicted in rows 645, 653 and 656 of FIG. 6C). Thus, database system 140 updates indexed data as shown in records 908 and 913 of FIG. 9.

Thus, when the following query is executed before the change of FIG. 8A,
select item_id, item_name, get_primary_supplier (item_id) from item_master where item_id=106;
the result may be as shown below:
106, Item6, Supplier6
Now, when the above query is re-executed for the same item (106) after the change of FIG. 8A, the result returned is:
106, Item6, Supplier6A.
FIG. 8B depicts deletion of a row in supplier_master table at a time instance following the state of FIG. 8A. Specifically, supplier 1013 (row 813 of table 800 of FIG. 8A) has been deleted from supplier_master table 820 of FIG. 8B. Database system 140 processes the change by retrieving row 562 (depicted in SQL view 560 of FIG. 5E) from dictionary table.

However, database system 140 does not update indexed data as supplier 1013 is not associated with any item. Thus, indexed data remains unchanged (same as in FIG. 9).

Additionally, in an embodiment, if a change represents a truncate operation of any of the tables containing at least one data class in the set of data classes specified in definition of the non-deterministic function, database system 140 may delete indexed data corresponding to item_master_idx01 index.

Figure 9:
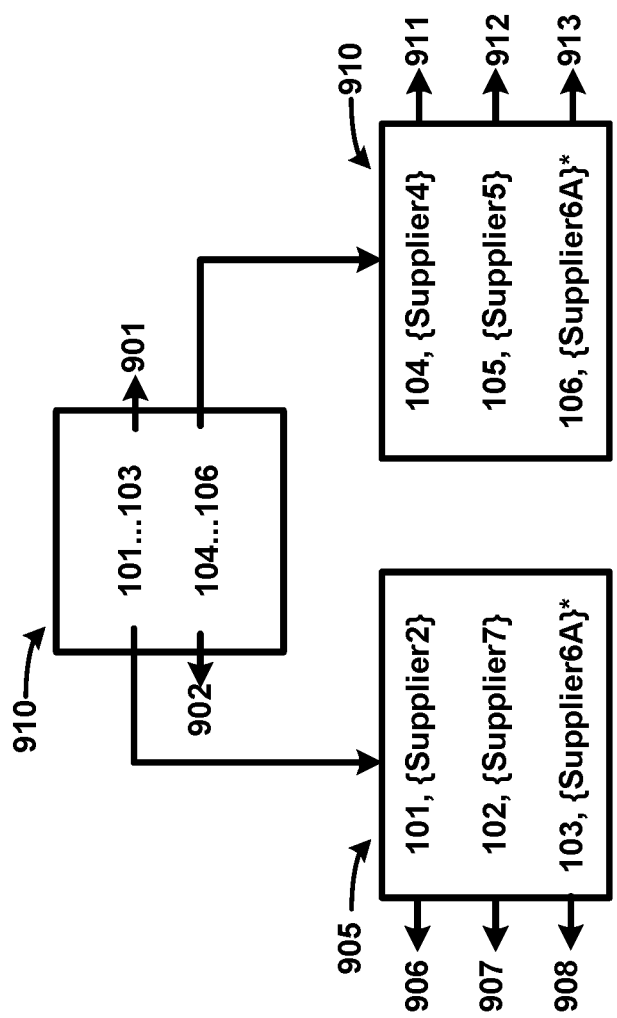
FIG. 9 depicts the changes to indexed data corresponding to the change of FIG. 8A.

For example, if item_supplier table is truncated, then database system 140 deletes indexed data shown in FIG. 9. Database system 140 determines the index corresponding to item_supplier table using dictionary table referred in FIG. 5D. Specifically, as noted above, database system 140 identifies the index to be item_master_idx01 from row 561 of FIG. 5E, and deletes the indexed data corresponding to item_master_idx01.

In this manner, database system 140 maintains indexed data for non-deterministic functions and improves throughput performance for queries involving the non-deterministic functions.

The sample changes described above are merely for the purpose of illustration. There may be other changes to data elements of data classes which may result in updates to indexed data, as will be apparent to a skilled practitioner. In addition, although the illustrative embodiments are described with respect to B-tree indexes, features of the present disclosure may be employed in other types of indexes (e.g. bitmap indexes) also as will be apparent to a skilled practitioner based on the disclosure provided herein.

While various embodiments are described above substantially with respect to relational databases for illustration, features of the present disclosure may be employed in other types of database systems also as will be apparent to a skilled practitioner based on the disclosure provided herein.

It should be further appreciated that the features described above can be implemented in various embodiments as a desired combination of one or more of hardware, software, and firmware. The description is continued with respect to an embodiment in which various features are operative when the software instructions described above are executed.

9. Digital Processing System

Figure 10:
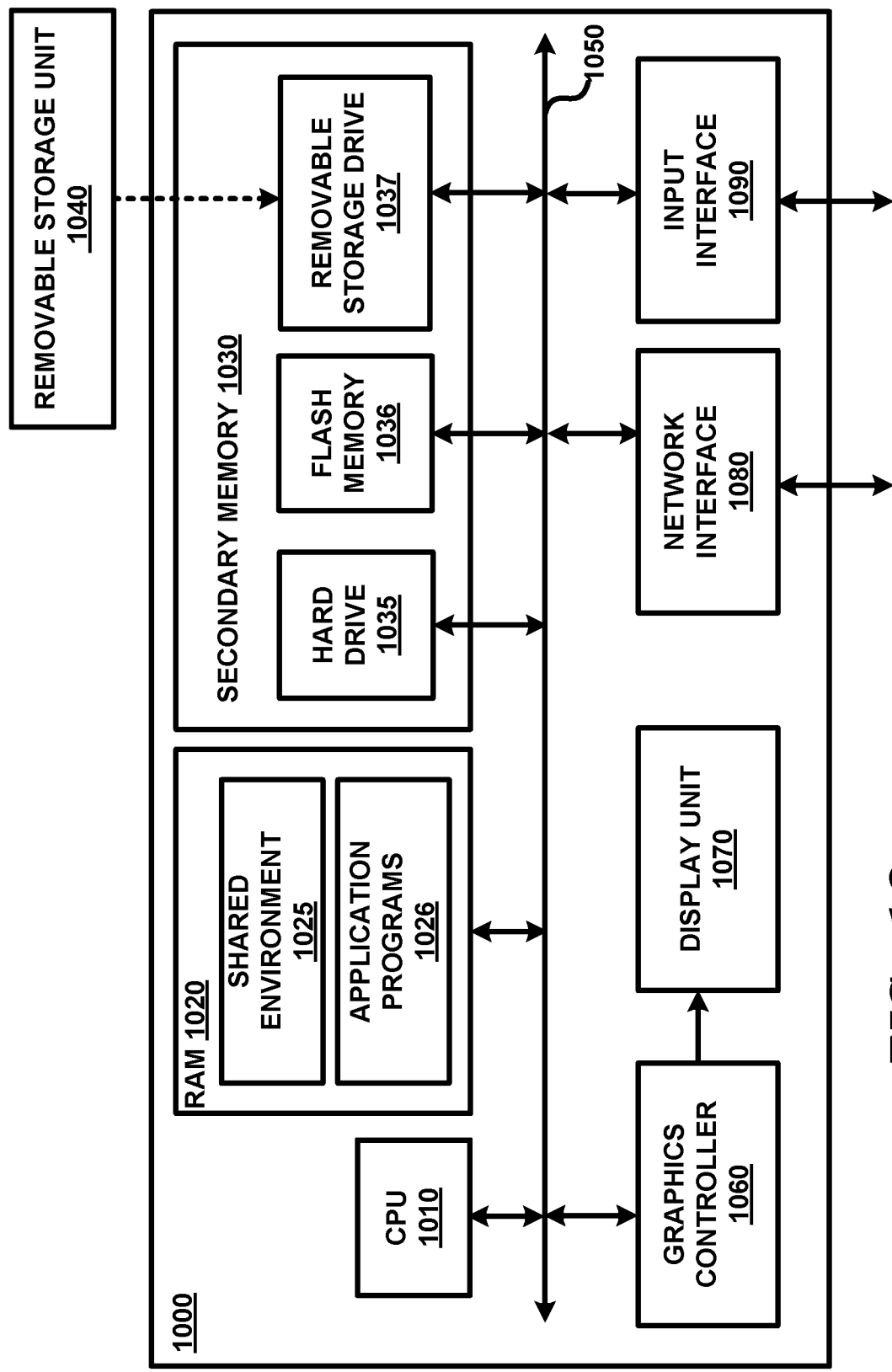
FIG. 10 is a block diagram illustrating the details of a digital processing system in which various aspects of the present disclosure are operative by execution of appropriate executable modules.

FIG. 10 is a block diagram illustrating the details of digital processing system 1000 in which various aspects of the present disclosure are operative by execution of appropriate executable modules. Digital processing system 1000 may correspond to database system 140 or one of user systems 110.

Digital processing system 1000 may contain one or more processors such as a central processing unit (CPU) 1010, random access memory (RAM) 1020, secondary memory 1030, graphics controller 1060, display unit 1070, network interface 1080, and input interface 1090. All the components except display unit 1070 may communicate with each other over communication path 1050, which may contain several buses as is well known in the relevant arts. The components of FIG. 10 are described below in further detail.

CPU 1010 may execute instructions stored in RAM 1020 to provide several features of the present disclosure. CPU 1010 may contain multiple processing units, with each processing unit potentially being designed for a specific task. Alternatively, CPU 1010 may contain only a single general-purpose processing unit.

RAM 1020 may receive instructions from secondary memory 1030 using communication path 1050. RAM 1020 is shown currently containing software instructions constituting shared environment 1025 and/or other user programs 1026. Shared environment 1025 contains software programs such as device drivers, operating systems, virtual machines, containers, etc., which provide a (shared) run time environment for execution of other/user programs.

Graphics controller 1060 generates display signals (e.g., in RGB format) to display unit 1070 based on data/instructions received from CPU 1010. Display unit 1070 contains a display screen to display the images defined by the display signals. Input interface 1090 may correspond to a keyboard and a pointing device (e.g., touch-pad, mouse) and may be used to provide inputs. Network interface 1080 provides connectivity to a network (e.g., using Internet Protocol), and may be used to communicate with database system 140 (of FIG. 1) connected to the networks (120).

Secondary memory 1030 may contain hard drive 1035, flash memory 1036, and removable storage drive 1037. Secondary memory 1030 may store the data and software instructions (for example, for implementing the various features of the present disclosure as shown in FIG. 4, FIG. 5A, etc.), which enable digital processing system 1000 to provide several features in accordance with the present disclosure. When digital processing system 1000 corresponds to database system 140, the persistent storage in secondary memory 1030 may form the basis for storing of various tables described in the instant application. The code/instructions stored in secondary memory 1030 may either be copied to RAM 1020 prior to execution by CPU 1010 for higher execution speeds, or may be directly executed by CPU 1010.

Some or all of the data and instructions may be provided on removable storage unit 1040, and the data and instructions may be read and provided by removable storage drive 1037 to CPU 1010. Removable storage unit 1040 may be implemented using medium and storage format compatible with removable storage drive 1037 such that removable storage drive 1037 can read the data and instructions. Thus, removable storage unit 1040 includes a computer readable (storage) medium having stored therein computer software and/or data. However, the computer (or machine, in general) readable medium can be in other forms (e.g., non-removable, random access, etc.).

In this document, the term "computer program product" is used to generally refer to removable storage unit 1040 or hard disk installed in hard drive 1035. These computer program products are means for providing software to digital processing system 1000. CPU 1010 may retrieve the software instructions, and execute the instructions to provide various features of the present disclosure described above.

The term "storage media/medium" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage memory 1030. Volatile media includes dynamic memory, such as RAM 1020. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge. One or more of such storage media, potentially stored in different systems, may be employed to store the instructions and data to provide various features described above.

Storage media is distinct from but may be used in conjunction with transmission media. Transmission media participates in transferring information between storage media. For example, transmission media includes coaxial cables, copper wire and fiber optics, including the wires that comprise bus 1050. Transmission media can also take the form of acoustic or light waves, such as those generated during radio-wave and infra-red data communications.

Reference throughout this specification to "one embodiment", "an embodiment", or similar language means that a particular feature, structure, or characteristic described in connection with the embodiment is included in at least one embodiment of the present disclosure. Thus, appearances of the phrases "in one embodiment", "in an embodiment" and similar language throughout this specification may, but do not necessarily, all refer to the same embodiment.

Furthermore, the described features, structures, or characteristics of the disclosure may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the disclosure.

10. Conclusion

While various embodiments of the present disclosure have been described above, it should be understood that they have been presented by way of example only, and not limitation. Thus, the breadth and scope of the present disclosure should not be limited by any of the above-described exemplary embodiments, but should be defined only in accordance with the following claims and their equivalents.

It should be understood that the figures and/or screen shots illustrated in the attachments highlighting the functionality and advantages of the present disclosure are presented for example purposes only. The present disclosure is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present disclosure in any way.

What is claimed is:

1. A method performed in a database system, the method comprising:
   receiving a request to maintain an indexed data for a non-deterministic function, wherein the non-deterministic function specifies a set of input variables and a set of output variables and a manner in which respective output values are generated for the set of output variables based on corresponding input values for the input variables, wherein the manner comprises operations defined based on a set of data classes in the database system;
   forming the indexed data indicating corresponding output values for respective set of input values for the set of input variables present in the set of data classes in the database sy stem;
   processing a first query to cause a change to data elements of a first data class of the set of data classes;
   in response to the change and the request, updating at a first time instance, a set of output values in the indexed data dependent on the changed data elements;
   receiving at a second time instance, following the first time instance, a second query that includes the non-deterministic function specifying values for input variables for which the indexed data specifies at least one output value which has been updated by the updating at the first time instance; and
   returning the at least one output value contained in the updated indexed data, as a response to the second query.

2. The method of claim 1, wherein the database system is a relational database system comprising a plurality of tables, and each of the set of data classes is a corresponding column of a table of the plurality of tables.

3. The method of claim 2, wherein the set of data classes is specified explicitly in a definition of the non-deterministic function.

4. The method of claim 2, wherein the change is a truncate operation of a first table of the plurality of tables, the first table containing at least one data class of the set of data classes,
   wherein the updating comprises deleting the indexed data.

5. The method of claim 1, wherein the change comprises one of insert, update and delete of a first data element in the first data class.

6. The method of claim 1, wherein the updating comprises invoking the non-deterministic function only for the corresponding changes,
   wherein, prior to the first time instance, the indexed data includes a first set of output values corresponding to a first set of input values of the non-deterministic function,
   wherein, at the first time instance, the updating comprises invoking the non-deterministic function with the first set of input values to generate a second set of output values and replacing the first set of output values with the second set of output values,
   wherein, at the second time instance, the second set of output values is returned in response to the second query.

7. The method of claim 6, wherein the forming further comprises inserting an association of the indexed data and the set of data classes in a dictionary table in response to the request to maintain the indexed data for the non-deterministic function specifying operations based on the set of data classes,
   wherein the dictionary table is checked for the association containing the first data class in response to the change caused to the first data class,
   wherein the updating is performed if the association is deemed to be present in the dictionary table.

8. A database system comprising:
   one or more memories for storing instructions; and
   one or more processors, wherein execution of the instructions by the one or more processors causes the database system to perform the actions of:
   receiving a request to maintain an indexed data for a non-deterministic function, wherein the non-deterministic function specifies a set of input variables and a set of output variables and a manner in which respective output values are generated for the set of output variables based on corresponding input values for the input variables, wherein the manner comprises operations defined based on a set of data classes in the database system;

forming the indexed data indicating corresponding output values for respective set of input values for the set of input variables present in the set of data classes in the database system;

processing a first query to cause a change to data elements of a first data class of the set of data classes;

in response to the change and the request, updating at a first time instance, a set of output values in the indexed data dependent on the changed data elements;

receiving at a second time instance, following the first time instance, a second query that includes the non-deterministic function specifying values for input variables for which the indexed data specifies at least one output value which has been updated by the updating at the first time instance; and returning the at least one output value contained in the updated indexed data, as a response to the second query.

9. The database system of claim 8, wherein the database system is a relational database system comprising a plurality of tables, and each of the set of data classes is a corresponding column of a table of the plurality of tables.

10. The database system of claim 9, wherein the set of data classes is specified explicitly in a definition of the non-deterministic function.

11. The database system of claim 9, wherein the change is a truncate operation of a first table of the plurality of tables, the first table containing at least one data class of the set of data classes,
wherein the updating comprises deleting the indexed data.

12. The database system of claim 8, wherein the change comprises one of insert, update and delete of a first data element in the first data class.

13. The database system of claim 8, wherein the updating comprises invoking the non-deterministic function only for the corresponding changes,
wherein, prior to the first time instance, the indexed data includes a first set of output values corresponding to a first set of input values of the non-deterministic function,
wherein, at the first time instance, the updating comprises invoking the non-deterministic function with the first set of input values to generate a second set of output values and replacing the first set of output values with the second set of output values,
wherein, at the second time instance, the second set of output values is returned in response to the second query.

14. The database system of claim 13, wherein the forming further comprises inserting an association of the indexed data and the set of data classes in a dictionary table in response to the request to maintain the indexed data for the non-deterministic function specifying operations based on the set of data classes,
wherein the dictionary table is checked for the association containing the first data class in response to the change caused to the first data class,
wherein the updating is performed if the association is deemed to be present in the dictionary table.

15. One or more non-transitory machine readable mediums storing one or more sequences of instructions for causing a database system to process queries including non-deterministic functions, the one or more sequences of instructions comprising:

a first set of instructions to receive a request to maintain an indexed data for a non-deterministic function, wherein the non-deterministic function specifies a set of input variables and a set of output variables and a manner in which respective output values are generated for the set of output variables based on corresponding input values for the input variables, wherein the manner comprises operations defined based on a set of data classes in the database system;

a second set of instructions to form the indexed data indicating corresponding output values for respective set of input values for the set of input variables present in the set of data classes in the database system;

a third set of instructions to process a first query to cause a change to data elements of a first data class of the set of data classes;

a fourth set of instructions, in response to the change and the request, updating at a first time instance, a set of output values in the indexed data dependent on the changed data elements; and a fifth set of instructions to:
receive at a second time instance, following the first time instance, a second query that includes the non-deterministic function specifying values for input variables for which the indexed data specifies at least one output value which has been updated by the updating at the first time instance; and
return the at least one output value contained in the updated indexed data, as a response to the second query.

16. The one or more non-transitory machine readable mediums of claim 15, wherein the database system is a relational database system comprising a plurality of tables, and each of the set of data classes is a corresponding column of a table of the plurality of tables.

17. The one or more non-transitory machine readable mediums of claim 16, wherein the set of data classes is specified explicitly in a definition of the non-deterministic function.

18. The one or more non-transitory machine readable mediums of claim 16, wherein the change is a truncate operation of a first table of the plurality of tables, the first table containing at least one data class of the set of data classes,
wherein the updating comprises deleting the indexed data,
wherein the change comprises one of insert, update and delete of a first data element in the first data class.

19. The one or more non-transitory machine readable mediums of claim 15, wherein the updating comprises invoking the non-deterministic function only for the corresponding changes,
wherein, prior to the first time instance, the indexed data includes a first set of output values corresponding to a first set of input values of the non-deterministic function,
wherein, at the first time instance, the updating comprises invoking the non-deterministic function with the first set of input values to generate a second set of output values and replacing the first set of output values with the second set of output values,
wherein, at the second time instance, the second set of output values is returned in response to the second query.

20. The one or more non-transitory machine readable mediums of claim 19, wherein the forming further comprises inserting an association of the indexed data and the set of data classes in a dictionary table in response to the request to maintain the indexed data for the non-deterministic function specifying operations based on the set of data classes,
   wherein the dictionary table is checked for the association containing the first data class in response to the change caused to the first data class,
   wherein the updating is performed if the association is deemed to be present in the dictionary table.

\* \* \* \* \*

UNITED STATES PATENT AND TRADEMARK OFFICE
CERTIFICATE OF CORRECTION

PATENT NO. : 11,372,843 B2
APPLICATION NO. : 17/037774
DATED : June 28, 2022
INVENTOR(S) : Sridevi Raman It is certified that error appears in the above-identified patent and that said Letters Patent is hereby corrected as shown below:

In the Specification

In Columns 4-5, Lines 67 (Column 4) 1 (Column 5), delete ""Supplierid"" and insert -- "Supplier_id" --, therefor.

In Column 9, Line 59, delete "Supplier1" and insert -- Supplier1. --, therefor.

In Column 10, Line 56, delete "Supplier6" and insert -- Supplier6. --, therefor.

In the Claims

In Column 13, Line 67, in Claim 1, delete "sy stem;" and insert -- system; --, therefor.

Signed and Sealed this
Twenty-seventh Day of December, 2022

Katherine Kelly Vidal
*Director of the United States Patent and Trademark Office*